(12) United States Patent
Backus (10) Patent No.: US 10,874,254 B2
(45) Date of Patent: Dec. 29, 2020

(54) OIL IMMERSION COOKER

(71) Applicant: Alan Backus, Los Angeles, CA (US)

(72) Inventor: Alan Backus, Los Angeles, CA (US)

(73) Assignee: Alan Backus, Los Angeles, CA (US)

(*) Notice: Subject to any disclaimer, the term of this patent is extended or adjusted under 35 U.S.C. 154(b) by 248 days.

(21) Appl. No.: 14/723,758

(22) Filed: May 28, 2015

(65) Prior Publication Data
US 2016/0345610 A1 Dec. 1, 2016

(51) Int. Cl.
*A47J 37/12* (2006.01)
*A47J 27/10* (2006.01)
*A23L 5/00* (2016.01)
*A23L 5/10* (2016.01)

(52) U.S. Cl.
CPC ............. *A47J 37/1214* (2013.01); *A23L 5/12* (2016.08); *A47J 27/10* (2013.01)

(58) Field of Classification Search
CPC ........ A47J 27/00; A47J 37/1214; A47J 27/10; A23L 5/12
USPC .. 219/620, 725, 440, 447.1, 448.13, 452.12; 99/324, 330, 326; 426/508, 401, 407, 426/410, 412
See application file for complete search history.

(56) References Cited

U.S. PATENT DOCUMENTS

2008/0066624 A1* 3/2008 Taylor ................ A47J 27/10 99/330
2010/0195939 A1* 8/2010 Tucker ................ B32B 7/12 383/116

FOREIGN PATENT DOCUMENTS

WO WO 2013026051 A2 * 2/2013 ............. A47J 36/32

OTHER PUBLICATIONS

Arnold, David. "Expanding Poaching's Potential." Sep. 2007. Food Arts. <http://foodarts.com/news/features/894/expanding-poachings-potential>. Accessed Sep. 27, 2016.*
Schneller, Tom. "Today's word . . . Plasticized." Jan. 1, 2010. The Butcher's Info Blog. <http://butcherinfoblog.blogspot.com/2010/01/todays-wordplasticized.html>. Accessed Sep. 27, 2016.*
Francois. "Sous Vide: Recipes, Techniques, and Equipment (Part 2)." Oct. 9, 2006. egForums Blog. ,https://forums.egullet.org/topic/144244-sous-vide-recipes-techniques-equipment-part-2/?page=13>. Accessed Oct. 11, 2016.*

* cited by examiner

*Primary Examiner* — Ericson M Lachica
(74) *Attorney, Agent, or Firm* — Ulmer & Berne LLP (57) ABSTRACT

Food preparation includes utilizing food immersion into low temperature cooking fluids, high temperature cooking fluids, or a combination of applications thereof. Foods are generally closely wrapped in vented, pliable, formidable outer skins. An example construction of such an outer skin is provided, as are examples of food preparation processes.

11 Claims, 8 Drawing Sheets

OIL IMMERSION COOKER

TECHNICAL FIELD

This application relates generally to devices which immersion cook foods in liquid.

BACKGROUND

Sous vide (meaning in French, "under vacuum") cooking systems have been in use for many years. These devices have employed various methods to contain foods inside of heat sealed, air evacuated plastic bags, and then immersed the evacuated bagged foods, for extended periods, into controlled, below boiling temperature (typically 212° F., 100° C. at sea level) water.

In many cases, this method has produced foods with pale or otherwise undesirable exterior appearance; grilling, pan searing, branding, or broiling, etc. have been commonly used as a post-cooking, third step, to surface color sous vide processed foods.

With sous vide, food quality has generally been considered to be excellent. This, in combination with the wide latitude cooking times that sous vide provides, probably accounts for at least two good reasons why so many well-regarded, high-end restaurants, both in the United States and in Europe, have, for many years, regularly used sous vide in the preparation of their cuisines.

Sous vide cooking has several, well recognized shortcomings.

One such shortcoming is the high cost of required equipment. Besides a typically several hundred dollar to in excess of several thousand dollars investment, sous vide cookers themselves, and sous vide generally, also required is a hundred dollar, to several thousand dollar, vacuum bag sealer (all amounts are in 2015 US dollars). This is probably at least partially why sous vide has been primarily used in commercial settings, such as the aforementioned high-end restaurants.

A second shortcoming is the high cost of plastic vacuum bags. Generally, each time a sous vide food article is prepared, it uses, and then disposes of such a bag. This is costly in dollar terms, as well as costly to the environment which supplies the materials to make these bags, absorbs any pollution that production of the plastic vacuum bags causes, and supplies the sites to dispose of them.

Further, as already mentioned, sous vide is generally a three separate step process, requiring at least: vacuum bagging, controlled temperature cooking, and then generally heat coloring (grilling, pan searing, branding, broiling, etc.).

SUMMARY

Brief Description of the Drawings

Various embodiments will become better understood with regard to the following description, appended claims and accompanying drawings wherein:

FIGS. 3 through 8 are views of an example embodiment of a food wrapping;

DETAILED DESCRIPTION

The present application teaches example embodiments that include accomplishing some of the fundamental associated with sous vide, such as extended period cooking at controlled temperatures which are below water's boiling point. In other example embodiments, sous vide's above-described shortcomings are addressed.

Instead of using expensive vacuum sealable bags, example embodiments teach wrapping of food in pliable, liquid tight, formable sheet outer skins, such as by way of an example embodiment, skins made of generally relatively inexpensive aluminum foil. These containing skins typically are formed to contact wrap foods, with the skins resting upon the foods' exterior surfaces.

Such a simplified wrapping process eliminates the need for an expensive bag sealer, as well as the continuing need for costly, environmentally undesirable, vacuum sealable bags.

Additional example embodiments eliminate the relatively complex job of vacuum sealing foods in vacuum sealable plastic bags, by implementation of a relatively easy task of just wrapping the foods in any suitable sheet-like wrap for associated cooking conditions, including aluminum foil, cooking wrap, or the like.

The present application teach example embodiments wherein warm water used in sous vide to cook is substituted with warm or hot cooking temperature oil, including, but not limited to, common cooking oils such as corn oil, vegetable oil, olive oil, canola oil, peanut oil, as well as most other cooking oils, as well as combinations of these common oils, as well as combinations of these common oils with other ingredients as will be understood by one of ordinary skill in the art. The term "oil" as used in conjunction with alternatives herein connotes use of individual elements, any sub-combination of individual elements as well as all listed elements simultaneously.

In other example embodiments, hydrogenated oils, shortenings, lard, or other materials which are normally solid, or semisolid at room temperature, but which are liquid or semi-liquid at temperatures above normal room temperatures, are implemented. As used herein, "oil" or "cooking oil" further suitably incorporates one or combinations of these materials, or any other suitable cooking fluid.

In further example embodiments, cooking oils, in combination with the above-described pliable, liquid tight, formable, outer skins (as an example, the illustrative aluminum foil wraps), enables accomplishing sous vide results below water boiling temperature cooking, as well as cooking temperatures at well above water's boiling point sufficient to desirable heat color outer food surfaces.

Example embodiments herein suitably implement a continuous cooking process, from food introduction to result in attractive food being ready for serving after preparation. Example embodiments include a continuous cooking process that need not be interrupted by a requirement to remove foods from the cooking baths in order to conduct the typical third sous vide process step, that of heat coloring the outer surfaces of the food, which in sous vide, generally requires interrupting the preparation process in order to move the food to a separate appliance such as a range top, oven, grill, broiler, or any other suitable heating mechanism.

Example embodiments herein provide several alternatives to sous vide while accomplishing some or all of its advantages. By way of example, users of the sous vide method have long taken sous vide prepared foods and refrigerated or freeze them after low-temperature sous vide cooking, and later reheated the sous vide prepared foods in preparation for serving. Conveniently, as taught herein, example embodiments allow for refrigeration or freezing of foods after low temperature cooking. However, it further improves over sous vide by facilitating food being reheated and partially cooked rapidly after such refrigeration or freezing. This is suitably accomplished by, after low-temperature cooking, and possible refrigeration or freezing that suitably follows re-immersing the room temperature, refrigerated or frozen foods back into a cooking fluid, while raising the fluid up to heating or cooking temperatures that are suitably above boiling water temperature.

The example embodiments noted above are suitably used independently, to rapidly heat, or reheat, or cook or otherwise prepare, many other fresh, or refrigerated, or frozen foods, in readiness for serving, or for other purposes. Such example embodiments are suitably implemented regardless of whether or not the foods have been prepared using any sous vide type processes, such as extended immersion in cooking liquid below boiling temperature.

Still further example embodiments teach additional preparation steps to efficiently and effectively accomplish cooking. Such additional procedures suitably include: adding spices, flavorings, or other additives to foods at one or more points during, before, or after any of the subject processes. At least part of the forgoing is enabled by wrapping foods, rather than vacuum bagging and heat sealing them, which allows for the foods to be easily unwrapped and rewrapped, once or multiple times, at virtually any time while such foods are being prepared using example embodiments, as well as before or after such preparation.

In an example embodiment, instead of being forced to put herbs, spices, or other flavorings, or other materials into a food container (plastic bag, or pliable wrap, by way example) only before sous vide-type cooking can occur, such ingredients might be added at one or multiple points in the cooking or other processes, such as, suitably around one quarter into the cooking process, and/or suitably three quarters through the cooking processes, etc., as hypothetical examples, to enhance the strength and/or character of their flavor contributions, and/or for other reasons. This contrasts with vacuum sealed plastic bags used in sous vide, which bags have very limited or no reseal capabilities at all.

In addition to the forgoing, oil temperatures above or below water boiling temperature are suitably altered at any point during any process step. This suitably includes extending or curtailing times at various temperatures, introducing new temperature steps, and/or altering times when intermediate procedures, such as, by way of example, addition of materials into or removal of materials from a food wrapper.

Example embodiments herein further facilitate added user convenience by permitting operations described herein while foods remain in their pliable cooking wrappers.

Figure 1:
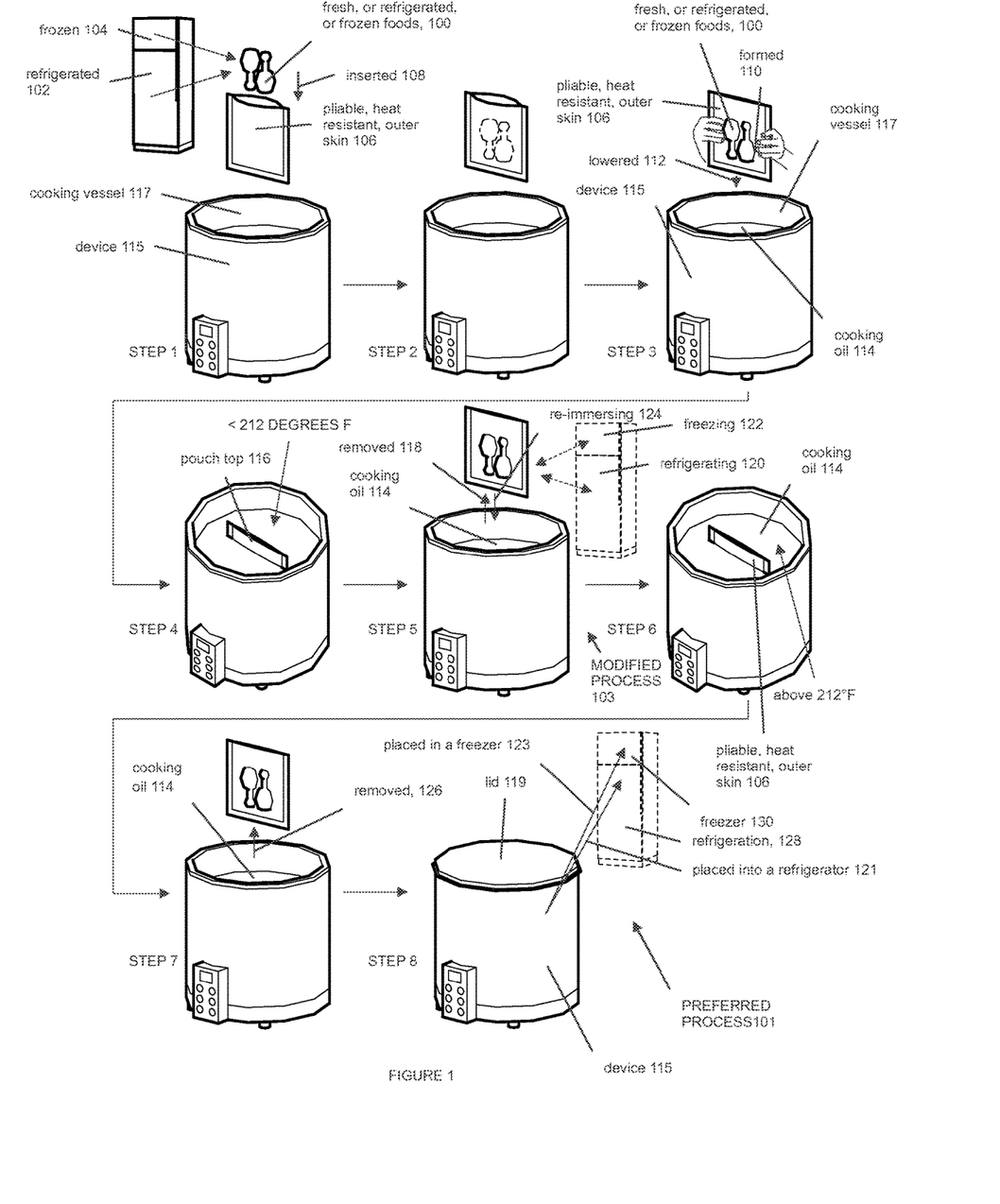
FIG. 1 is a diagram of an example embodiment of a cooking method.

In an example embodiment, referring to FIG. 1, foods need not be removed from their wrappers to store them at room temperature, or under refrigeration, or within a freezer as described as options during step 5 (also likewise as preparation in step 1). Likewise, in step 5, users are provided with an option to remove foods 118, and then broil, bake, brand, grill, or otherwise treat them to add food surface color, analogously to sous vide. Foods need not necessarily be removed from their wrappers to perform such processes.

Most sous vide cooking apparatus are suitably used with the example embodiments disclosed herein. By way of further example, immersion circulation heaters, which are suitably fluid pumps operating in-line with a thermostat and a heater with a thermostat temperature being operator set, and regulating the heater and/or the pump, are suitably implemented for both low temperatures, such as below boiling, and high temperatures, such as above boiling, during food preparation. Such devices have been used in sous vide to pull water out of, and then re-introduce temperature controlled water back into sous vide immersion baths. These devices serve to circulate and control the temperatures of sous vide immersion baths.

In another example embodiment, an immersion circulation heater is suitably be used in example embodiment 170, to replace or augment heat coil 178, and/or thermal sensor 175, and provide thermal control and circulation to liquids contained within cooking vessel 176.

In another example embodiment, an immersion circulation heater might be used in example embodiment 226 for like purposes.

As further example embodiments, many sous vide fluid circulators, turbulence generators, heat sources, and/or heat sensors are suitably adapted for use with embodiments of present example embodiments, including with example embodiments taught herein.

It should be noted that in general, in present example embodiments, the food being prepared does not have direct contact with the warm or hot oil being used to prepare it. Thus, virtually any temperature and consistency suitable liquid, or semi liquid, or semi solid might be appropriate as cooking oils described herein. It is further understood that there is even no specific need for food grade materials to be used.

Likewise, because food does not have direct contact with cooking oil, there is no need for health concern regarding undesirable oil nutritional content, such as, by way of example an embodiments' high fat content, or the presence of trans fats. Thus, the herein use of the terms "oil" and "cooking oil," is understood to be inclusive of any such alternative materials as will be understood by one of ordinary skill in the art.

The present example embodiment use of cooking oils at least provides for efficient thermal transfer, potentially resulting in desirable shorter cooking times and/or more even cooking temperatures.

Because example embodiments can fully cook foods at temperatures well below temperatures used by conventional cooking means, such example embodiments may produce cooked food product with significantly higher nutritional content than conventionally cooked foods. Heat is known to deteriorate vitamin and other nutritional food content.

Insofar as the cooking oil used in example embodiments does not have direct contaminating contact with foods being prepared, the oil may have extensive usable life.

It should be noted that present example embodiment suitably utilizes aluminum foil to wrap foods, instead of sous vide's plastic bags. Aluminum foil is repeatedly recyclable, which is unlike the plastic bags which generally must be remanufactured using new raw materials, before each use, and must later be disposed of after each use.

Referring to FIG. 1 as an example embodiment, process 101 suitably starts with fresh, or refrigerated, or frozen foods, or foods in other states 100. All kinds, shapes, freshnesses, and sizes of foods suitably may be used, including, but not limited to: room temperature, refrigerated 102, or frozen 104, meats, fruits, vegetables, etc., of any appropriate size or shape, etc.

Such potential foods are well known and well documented in sous vide cooking (see the Information Disclosure Statement (IDS) included with this application—the information contained within IDS documents being hereby included into this specification by reference).

In STEPS 1 and 2, foods 100 are wrapped in pliable outer skins, such as, by way of an example embodiment, pliable, liquid tight, formable, outer skin 106, which is suitably formed from aluminum foil. A lubricant, such as example spray cooking oil, may optionally be applied to the inside of wrapping skin 106 and/or onto example foods 100.

In STEP 3, the outer surface of pliable, liquid tight, formable, outer skin 106 is formed 110 to contact and follow the outer surfaces of foods 100. Formation by hand is shown in FIG. 1, STEP 3, however, formation is suitably done, as an example embodiment, using sponge-like or pillow-like pads to press in on a pliable, liquid tight, formable, outer skin 106; or by sucking air out of outer skin 106 (i.e. pulling a vacuum), or by increasing air or fluid pressure around outer skin 106, or simply by relying on fluid pressure exerted by cooking oil 114, pressing against a pliable, liquid tight, formable, outer skin 106, when foods 100 enwrapped in pliable, liquid tight, formable, outer skin 106, are immersed into cooking oil 114.

In STEPS 3 and 4, pliable, liquid tight, formable, outer skin 106, including contained foods 100, is lowered 112 into cooking oil 114 which is contained in device 115. Device 115 is suitably cooking vessel 117 that is configured to generate various, generally operator directed, temperatures to fluids contained within cooking vessel 117.

For STEPS 3 and 4, cooking oil 114 is suitably heated to sous vide cooking temperatures, which are below the temperature of boiling water. The exact temperature to which oil 114 is heated is dependent on desired cooking outcome(s), as well as on the food nature, food temperature, and/or other factors. Such factors relative to cooking times and temperatures are understood by practitioners of sous vide.

Pliable, liquid tight, formable, outer skin 106 is suitably formed so it exits fluids out from, or adjacent to one of its edges, generally out its top 116, more easily than it exits fluids from elsewhere on its containment structure, including generally, any of pliable, liquid tight, formable, outer skin 106's lower portions. Alternatively, this easier fluid exit suitably occurs anywhere on pliable, liquid tight, formable, outer skin 106.

In general, the above structure functions to at least let steam and/or water vapor and/or expanding gases exit from containment pliable, liquid tight, formable, outer skin 106 during any of the present example embodiments cooking and other processes, so at least that steam and/or water vapor and/or expanding gases don't bloat or balloon pliable, liquid tight, formable, outer skin 106. It will be noted that this contrasts with sous vide, which inherently prevents fluids from exiting out of its heat sealed plastic vacuum bags.

As shown in STEP 4, pouch top 116, along with its fluid exit(s) are generally, although not necessarily, left above the surface of cooking oil 114. As a noted exception, everything up to and including the entirety of pliable, liquid tight, formable, outer skin 106 is suitably fully immersed.

In STEP 4, pliable, liquid tight, formable, outer skin 106, along with its contained food 100, is left in the sous vide, below boiling temperature cooking oil 114 for extended periods of time ranging from many minutes, to several days. These times are also well known to practitioners of sous vide, and have been extensively published, including many variations.

STEP 5 is optional. In this step, food is suitably removed 118 from cooking oil 114. As example embodiments, this suitably serves foods 100, or it is usable for other purposes, including, but not limited to, refrigerating 120, or freezing 122, or for other food preservation or other preparations of foods 100, or for other purposes.

As an example embodiment of this, removal of foods in STEP 5 is suitably used to prepare foods using other cooking techniques, including, but not limited to grilling, pan searing, branding, broiling, or any other suitably cooking or heating methods as will be understood by one of ordinary skill in the art.

STEP 5 suitably includes re-immersing 124 pliable, liquid tight, formable, outer skin 106 with contained foods 100, back into cooking oil 114, which is suitably raised to temperatures above boiling water, for further cooking or coloring of the surfaces of foods 100, or for serving, or for other purposes.

In STEP 6, foods 100, contained in pliable, liquid tight, formable, outer skin 106, are left in cooking oil 114, which is heated to above boiling water temperatures, for the time necessary to achieve one or more desired cooking outcome(s), possibly including, but not limited to, a desired level of food surface coloring, and/or a desired level of tenderness, and/or a desired level of sterility, and/or a desired serving temperature, and/or one or more other desired outcomes.

In STEP 7, foods 100, contained in pliable, liquid tight, formable, outer skin 106, are removed 126 from cooking oil 114 for serving, or for other purposes, such purposes possibly, but not necessarily including: refrigerating, freezing, or other methods of food preservation, or for other reasons.

In STEP 8, device 115 is inactive. Cooking oil 114 is suitably stored in cooking vessel 117, or in the container the cooking oil came in, or in other forms of containment; or is suitably directly disposed of, possibly using the container it came in, if it is no longer of a useful quality. Alternatively, it is suitably stored at room temperature, or under refrigeration 128, or within a freezer 130, or at other temperatures. It is also suitably stored in the open, or in one or more loosely or tightly sealed vessels, which suitably includes, but are not necessarily limited to, cooking vessel 117, or a container cooking oil 114 came in, or other suitable container or receptacle.

As another example embodiment, during inactivity, cooking vessel 117 suitably has lid 119 placed over it, and then lidded 119 device 115, or just lidded 119 cooking vessel 117 alone, is suitably left on the countertop, or placed into a refrigerator 128, or a freezer 130.

Use of pliable, liquid tight, formable, outer skins 106, helps seal in food flavors, juices and nutrients, during the cooking or other processes. This contrast with other food cooking methods, which not only cook off nutrients, but also allow them to drip, leach, and/or vaporize away. Even methods like pressure steam cooking (i.e. pressure cookers) which tout sealing in nutrients, still allow vaporization, leaching and/or dripping of nutrients into a cooking chamber. Embodiments of the present example embodiments allow for close wrapping of foods, which helps insure that the nutrients remain in close proximity to the foods.

As an alternative to the above example process 101, STEP 1 through STEP 5 (up to and through food removal 118), are suitably done independently of steps 6 through 8, and using water to replace cooking oil 114. A primary difference between this new modified process, herein identified as modified process 103, and sous vide's processes, being that the pliable, liquid tight, formable, outer skin 106, used in new modified process 103, replaces sous vide's evacuated and sealed plastic bags. Among other things, this may, as described earlier, simplify the sous vide process by at least eliminating vacuum bagging.

Referring to present example embodiments in general, with specific attention called to STEPS 1 through 5 above, as well as the treatment of foods analogous in sous vide to those occurring before STEP 1 or after STEP 5 above, most: recipes, procedures, preparations, food treatments, and other teachings which are given for sous vide, may be literally or principally be adapted to example embodiments, as will be understood by one of ordinary skill in the art.

Figure 2:
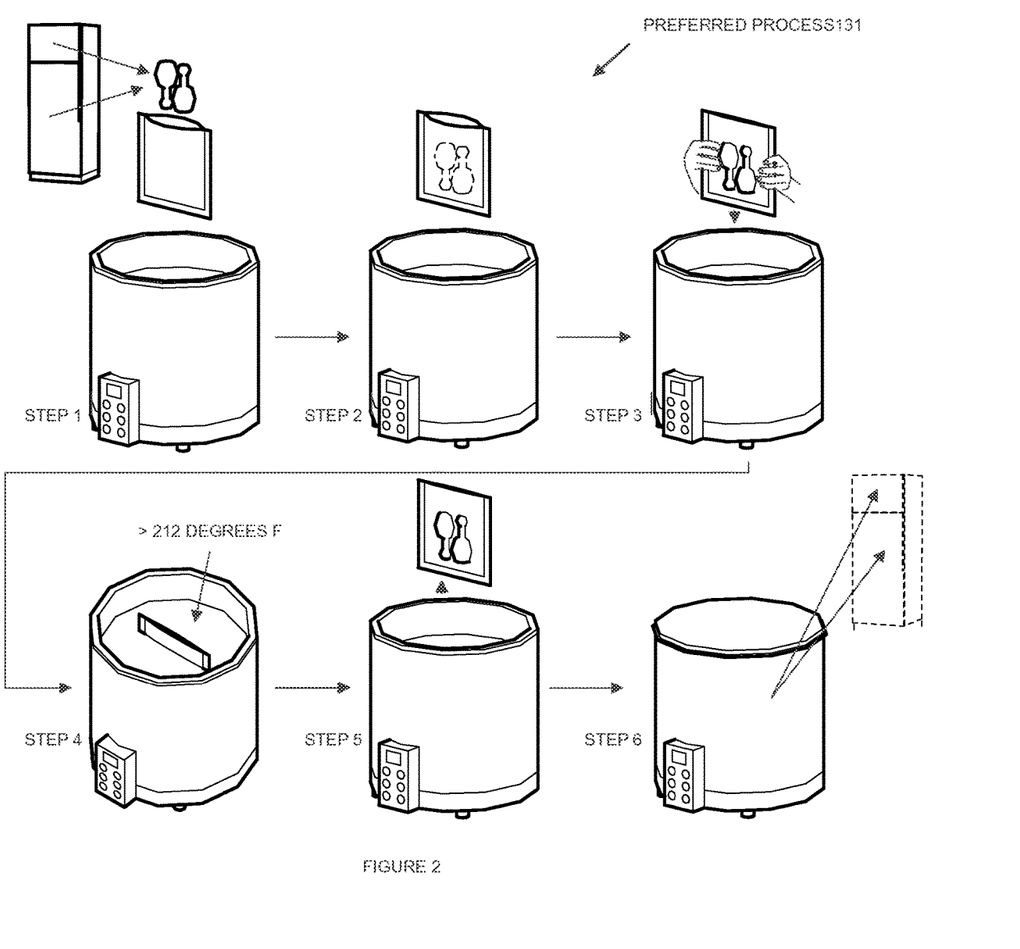
FIG. 2 is a diagram of an example embodiment of a cooking method.

Example Process 131—FIG. 2:

In FIG. 2, STEPS 1 through 3 are analogous to STEPS 1 through 3 in FIG. 1, with essentially the same descriptions as given in FIG. 1 for each respective STEP.

STEP 4 in FIG. 2 is similar to STEP 4 in FIG. 1, except cooking oil temperatures are raised to above boiling, and the cooking immersion time or times are appropriate for the higher temperatures, as well as for the desired cooking outcomes. As already noted herein, this allows for various food preparations, including, but not limited to: heat coloring or browning of foods, and/or rapid thawing, and/or heating of foods, and/or cooking of foods, and/or adding spices, flavorings or other additives to foods, and/or to achieve desired serving temperatures, and/or for other food preparations, and/or for other reasons.

The description of STEP 4 in FIG. 2 is analogous to that for STEP 4 in FIG. 1, with the temperature change alterations noted directly above.

STEPS 5 and 6 in FIG. 2 are analogous to STEPS 7 and 8, respectively, in FIG. 1, and are suitably described analogously.

Example process 131 is suitably used for a variety of purposes, including, but not limited to, being a step taken to further prepare foods after sous vide-type cooking, or to further prepare foods that have not been sous vide prepared, or to prepare foods that are frozen, refrigerated, or at room temperature, or for other purposes.

Example Fabrication of an Outer Food Containment Skin—FIGS. 3 Through 8:

FIGS. 3 through 8 show an example embodiment, of how a present example embodiment outer food containment skin is suitably fabricated.

Figure 3:
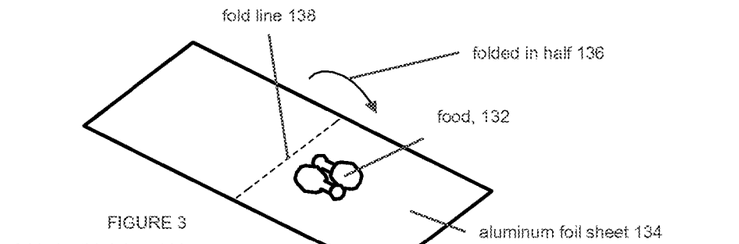

In FIG. 3, food 132 is placed on top of aluminum foil sheet 134, and aluminum foil sheet 134 is then folded in half 136, generally along fold line 138.

Figure 4:
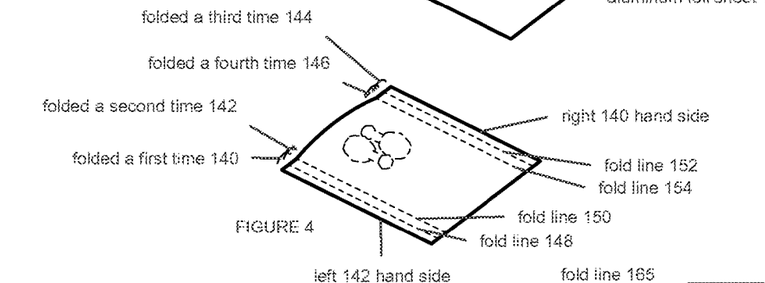

In FIG. 4, aluminum foil sheet 134 is again folded a first 140, a second 142, a third, 144, and a fourth time 146, along fold lines 148, 150, 152, and 154. The folds are then advantageously tightly compressively flattened.

Figure 5:
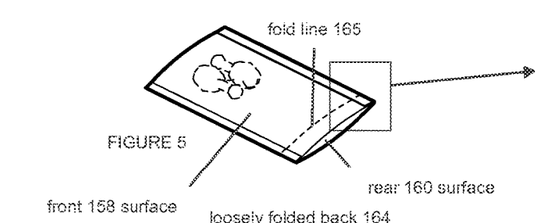
Figure 6:
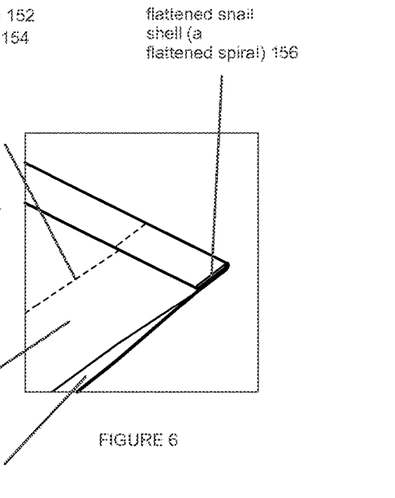

As illustrated in FIGS. 5 and 6, additional folding 140, 142, 144, and 146 and compression produces liquid tight side seams which have a cross-section (reference in particular FIG. 6) resembling a flattened snail shell or crushed spiral 156.

Figure 7:
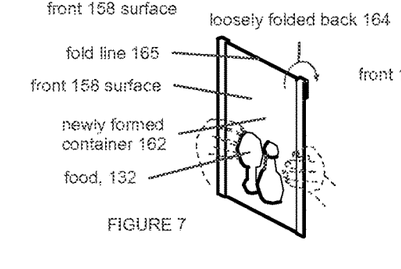

In FIG. 7, the front 158 and rear 160 surfaces of folded aluminum sheet 134 are formed against the outer surface contours of food 132, and the top of newly formed container 162 is loosely folded back 164 generally along fold line 165.

From here, container 162 with its contents, food 132, is placed into cooking oil.

As shown in FIG. 8, this placement into cooking oil is suitably facilitated by mounting container 162, along with contained food 132, as well as zero, one, or more typical counterparts, on a food mount, such as non-limiting and non-exhaustive example food mount 166. Optional clips 168 suitably aid in this endeavor.

The directly above fabrication produces a food container formed so it expels fluids out one portion of its containment structure more easily than it expels fluids elsewhere. More specifically, this containment structure expels fluids out at its top, more easily than it expels fluids from its lower portions.

Figures 9, 10:
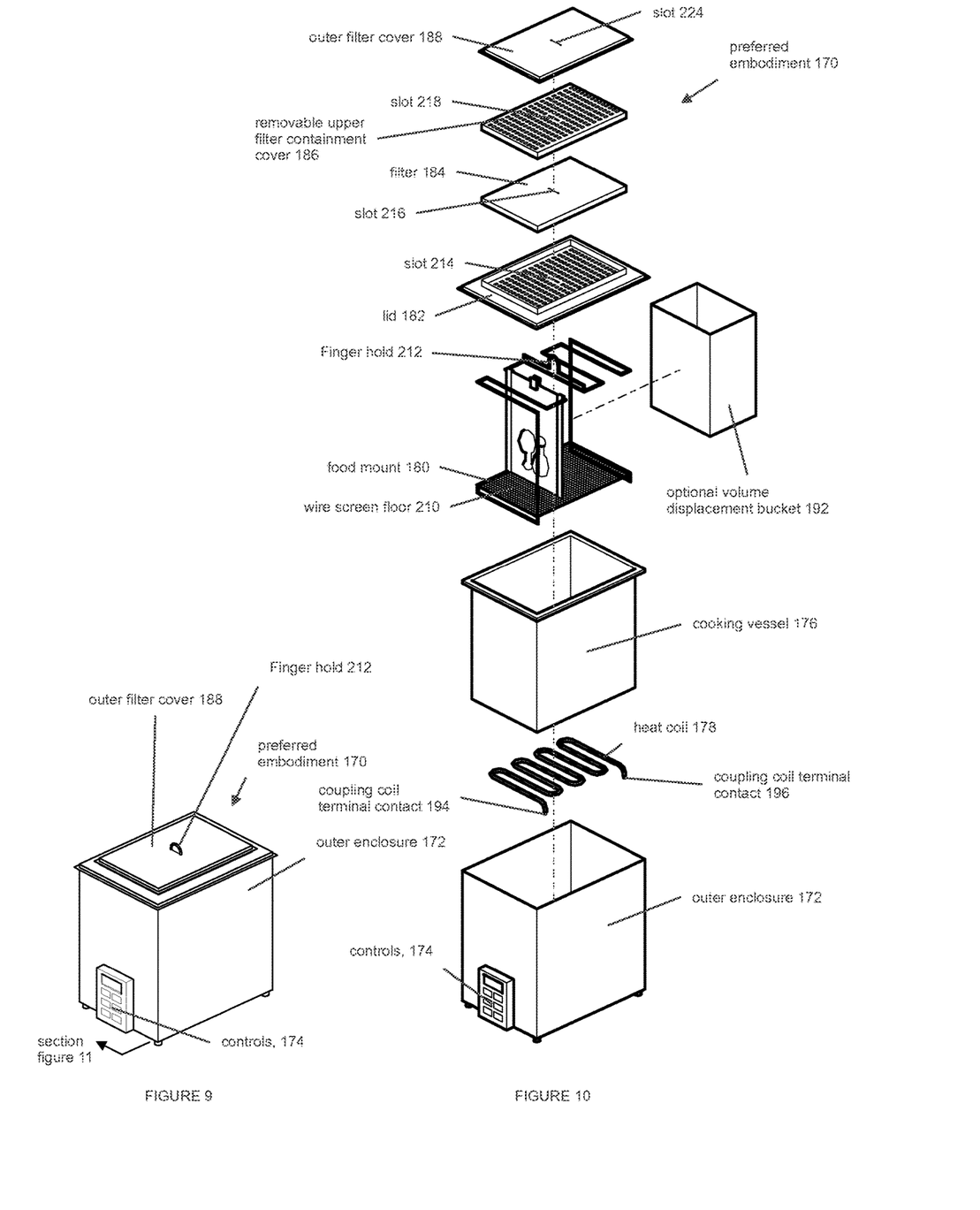
FIG. 9 illustrates an example embodiment of a food cooker.
FIG. 10, is an exploded view of an example embodiment of a food cooker.
Figure 11:
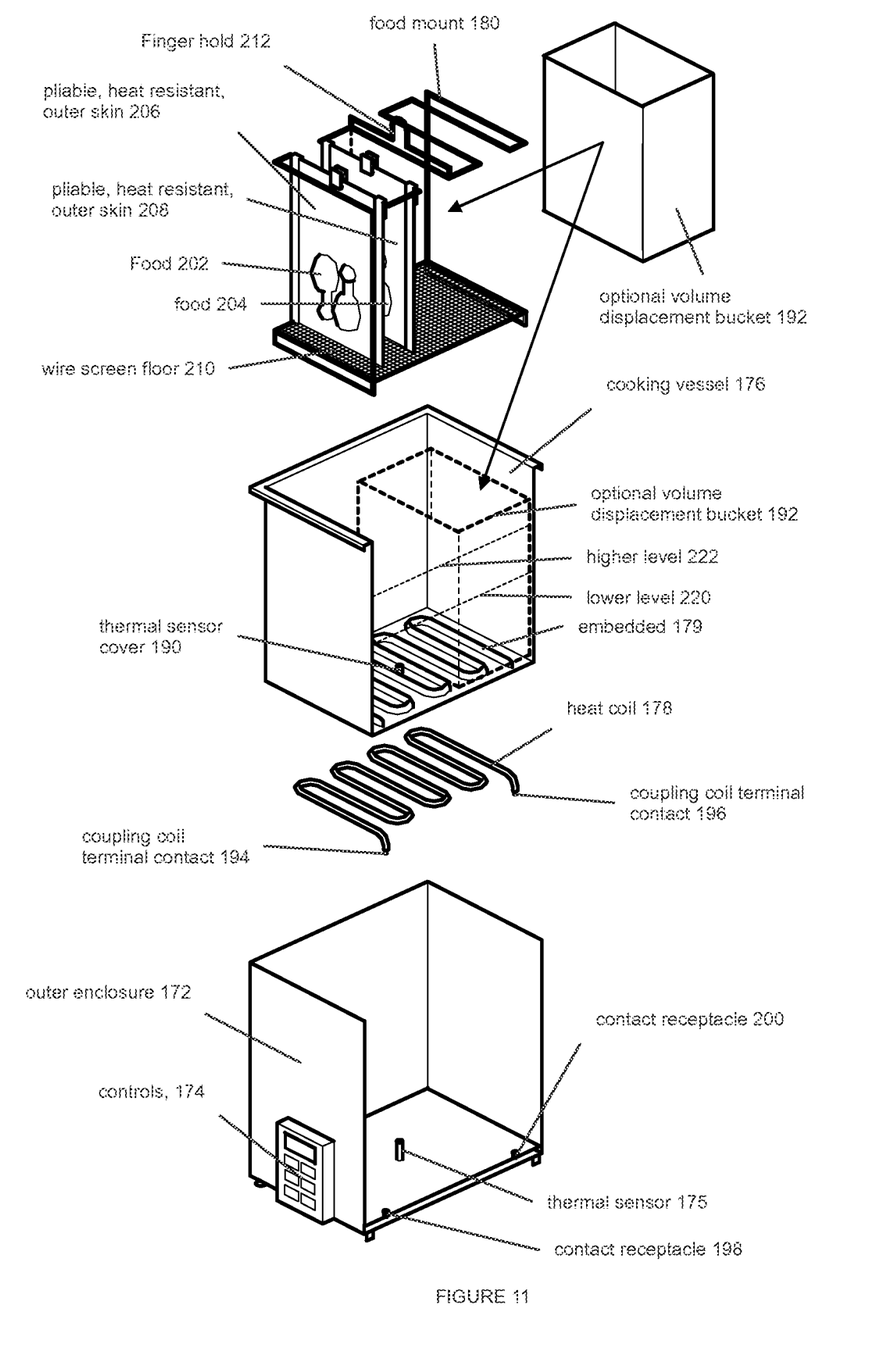
FIG. 11, is an exploded, cutaway perspective of an example embodiment of a food cooker with a section plane through one of its sides as indicated in FIG. 9.

Example Embodiment 170—FIGS. 9 Through 11:

FIGS. 9 through 11, as an example embodiment, illustrate example embodiment 170. Example embodiment 170 comprises: outer enclosure 172, which mounts controls 174 and thermal sensor 175 (FIG. 11), and selectively removably mounts cooking vessel 176, which includes heat coil 178 embedded 179 into cooking vessel 176's floor (particularly FIG. 11).

Also included in example embodiment 170 are food mount 180, which from time to time suitably removably rest within cooking vessel 176; and from time to time cooking vessel 176 is suitably covered by lid 182, which in turn mounts filter 184 under removable upper filter containment cover 186, which from time to time in turn, is suitably covered by outer filter cover 188, particularly between uses, at least to possibly reduce leakage of any possible undesirable odors.

Further included in embodiment 170, is high aspect ratio (taller than it is wide) thermal sensor cover 190 (FIG. 11), which protrudes upward from the floor of cooking vessel 176, and houses thermal sensor 175 when cooking vessel 176 is fully mounted within outer enclosure 172.

Optional volume displacement bucket 192, is suitably disposed within cooking vessel 176 from time to time to advantageously reduce cooking oil usage or to decrease warm-up times, or for other reasons.

Heat coil 178 has coupling coil terminal contacts 194 and 196, which mate with contact receptacles 198 and 200 respectively, when cooking vessel 176, is fully mounted within outer enclosure 172.

Foods 202 and 204 contained within pliable, outer skins 206 and 208 respectively, are shown mounted to food mount 180 (FIG. 11).

Food mount 180 comprises wire screen floor 210, which prevents foods from getting too close to heat coil 178 during cooking.

In general, as an example embodiment, food, mount 180 is suitably constructed from formed and joined, plated or coated, metal wire screening and metal rod.

Finger hold 212, generally located in the middle of the top of food mount 180 (FIGS. 9, 10, and 11 in particular), from time to time suitably simultaneously penetrate the assembly comprising lid 182, filter 184, and removable upper filter containment cover 186, through slots 214, 216, and 218 respectively (FIG. 10 in particular).

This advantageously allows lid 182, its mounted filter 184, and its removable upper filter containment cover 186 to be hand lifted as a unit, thus possibly reducing the chances of a user being splashed by cooking oil of any temperature, while removing or inserting food mount 180, from or into cooking vessel 176, or at other times. Under these circumstances, lid 182 suitably acts as a shield between user and oil contained in cooking vessel 176.

At any time during example embodiment 170 operations, outer filter cover 188 is suitably penetrated through slot 224 by finger hold 212 (FIG. 9. In particular). This allows outer filter cover 188 to freely be present or not, during any example embodiment 170 operations. As a general rule, however, outer filter cover 188 is present only when embodiment 170 is not in operation. A noted exception to this might be if embodiment 170 is used for food steaming, where outer filter cover 188 might advantageously help to build steam pressure within lid 182 covered cooking vessel 176.

Alternatively, food mount 180 suitably remains within cooking vessel 176 after assembled lid 182, including its filter 184, and removable upper filter containment cover 186 are removed. This is done simply by lifting lid 182 independently away from food mount 180.

Also, as an example embodiment, heat input into the cooking fluid (oil, as an example embodiment) contained within cooking vessel 176 for lower temperature cooking processes is suitably half or less of that used for higher temperature cooking processes.

As a specific example embodiment of this, heat coil 178 suitably utilizes 1700 watts of energy for higher temperature cooking processes and yet suitably uses less than 60 watts of energy for lower temperature cooking processes. This advantageously helps keep cooking oil temperatures more even by eliminating sharp spikes caused by an overly-powerful heater.

Also, as an example embodiment, this is suitably accomplished simply by having two heat coils (one low wattage, one high wattage), or having a heat coil constructed to have at least two different power ratings, or it is suitably done electronically, as an example embodiment, in a construction similar to that used in home light dimmers, or it is suitably accomplished using other methods or apparatus.

Optional open-topped, rectangular, fluid-tight, volume displacement bucket 192 is suitably mounted into, or removed from, cooking vessel 176 during any embodiment 170 related operation. When present, it displaces space normally occupied by oil within cooking vessel 176, with air contained within open-topped bucket 192. This suitably raises a cooking oil level from a reduced amount of cooking oil, at, as an example, a lower level 220, to a higher level 222 (FIG. 11 in particular).

This in turn suitably reduces oil usage when less food capacity is acceptable, or, it suitably decrease undesirable warm-up times, when less food capacity is acceptable, or it suitably conveys other benefits.

In operation, cooking vessel 176 is suitably lowered into outer enclosure 172, making possible energization of heat coil 178 by coupling coil terminal contacts 194 and 196 mating with contact receptacles 198 and 200 respectively.

Simultaneous with this, thermal sensor 175 moves up inside of tall aspect ratio (taller than it is wide) thermal sensor cover 190, resulting in thermal sensor 175, being directly proximate on its top and sides to oil contained within cooking vessel 176. This placement may advantageously helps add accuracy and/or reduce response times for thermal sensor 175.

In addition, thermal sensor cover 190 is suitably constructed to have thin walls, and/or is suitably fabricated from aluminum, copper, or other thermally efficient conductive materials. Either or both of these also may advantageously improve thermal sensor 175 accuracy, and/or favorably reduce thermal sensor 175 response times.

Example Embodiment 226—FIGS. 12 Through 16:

FIGS. 12 through 16 show example embodiment 226.

Figure 14:
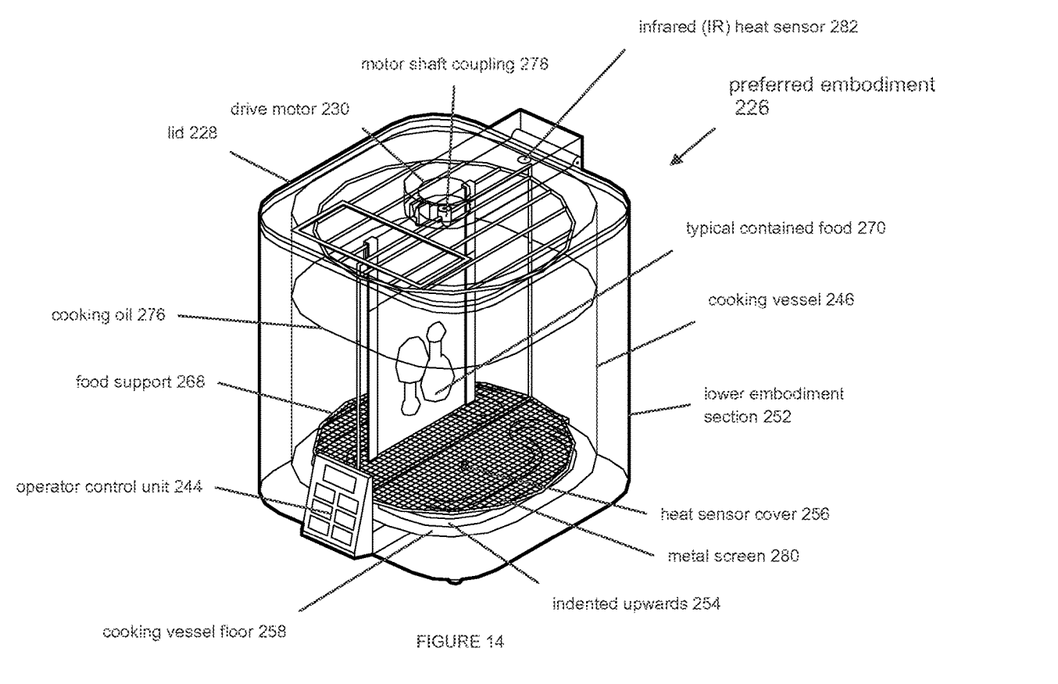
FIG. 14, is a perspective view of an example embodiment of food cooker with its forward facing walls, and its lid, made translucent for illustrative purposes.
Figure 16:
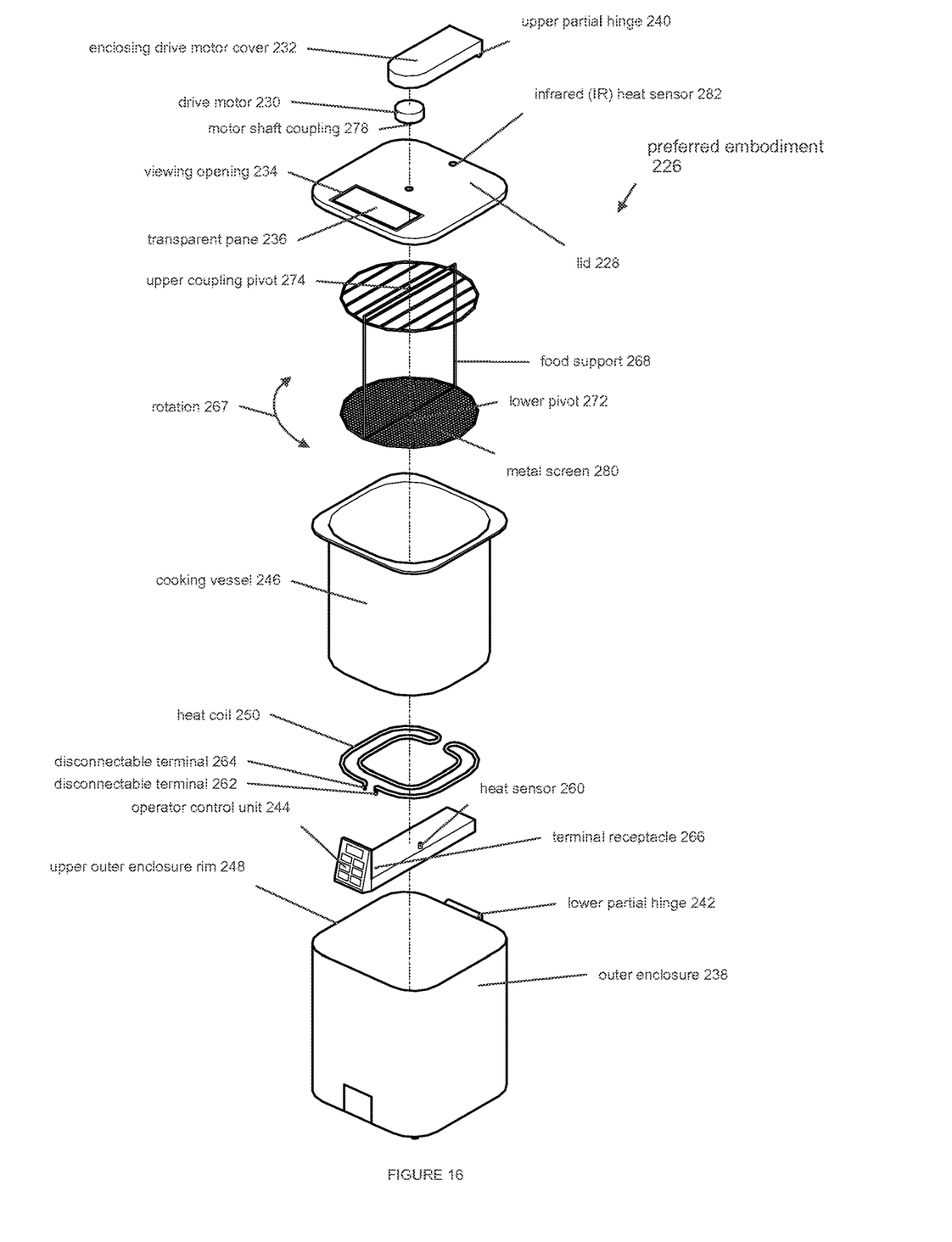
FIG. 16, is an exploded perspective view of an example embodiment of a food cooker.

Example embodiment 226 is comprised of: lid 228, which has drive motor 230, along with enclosing drive motor cover 232, mounted on its upper surface (FIGS. 14 and 16. In particular).

Lid 228 is also penetrated by viewing opening 234, which includes transparent pane 236.

Lid 228 is connected to outer enclosure 238 through the cooperation between upper partial hinge 240 and lower partial hinge 242. This cooperative configuration also allows electrical or other linkage between drive motor 230 (as well as potentially between other components directly or indirectly coupled to lid 228), and components directly or indirectly coupled to lower embodiment section 252, including, but not limited to, operator control unit 244.

Figure 12:
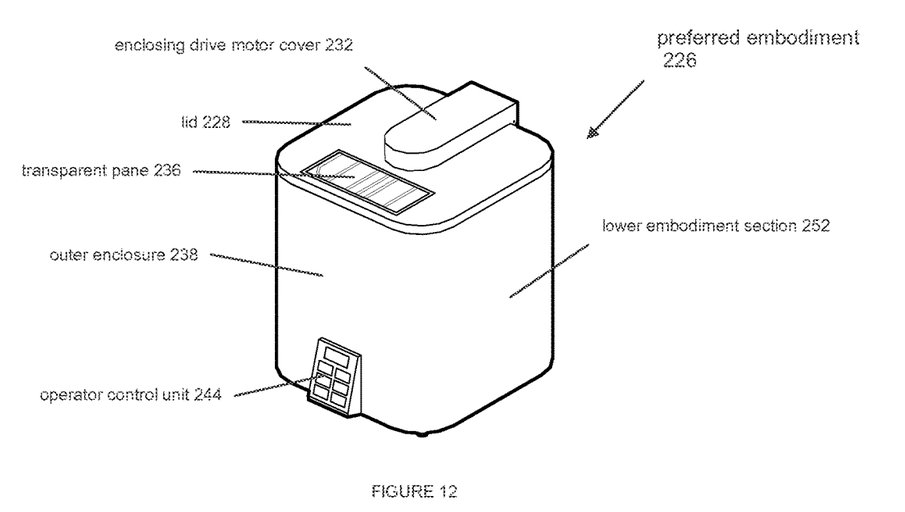
FIG. 12, is a perspective view of an example embodiment of a food cooker.

From time to time, lid 228, in its down position, suitably covers cooking vessel 246, as shown in FIG. 12. Cooking vessel 246 is configured to fit within outer enclosure 238, and to rest against upper outer enclosure rim 248 (FIG. 16 in particular).

Heat coil 250 is indented upwards 254 (FIG. 14) into, and protrudes above, cooking vessel floor 258 (FIG. 14).

Also protruding above cooking vessel floor 258, is tall aspect ratio (taller than it is wide) heat sensor cover 256, which, from time to time, when cooking vessel 246 is fully mounted within outer enclosure 238, houses heat sensor 260. Heat sensor 260 is suitably, although need not necessarily be, spring-loaded upward to facilitate proper insertion into heat sensor cover 256, when cooking vessel 246 is lowered into outer enclosure 238.

Heat coil 250 is abutted on a first end by disconnectable terminal 262, and on its other end by disconnectable terminal 264. When cooking vessel 246 is lowered into outer enclosure 738, these mate, respectively, with terminal receptacle 266 (particularly FIG. 16), and a second terminal receptacle, which is not illustrated.

Figure 15:
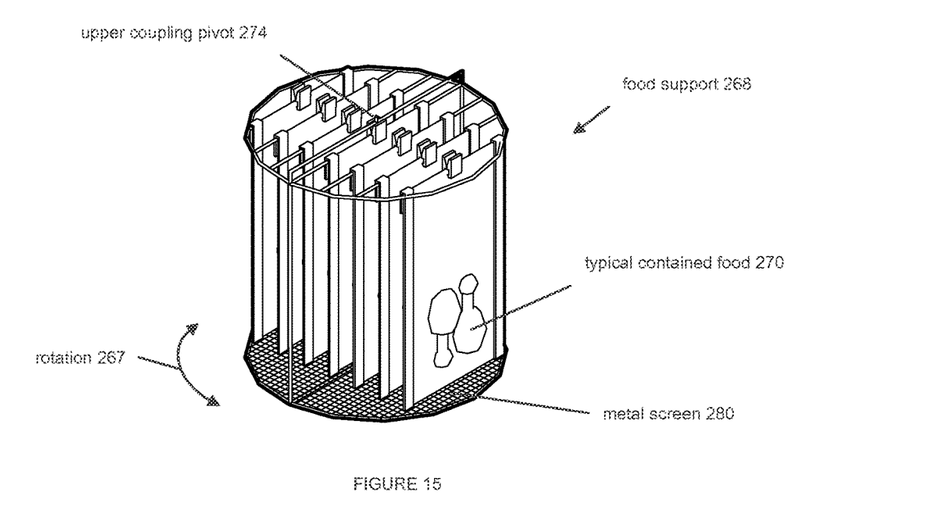
FIG. 15 is a perspective of an example embodiment of a food support.

Food support 268 is suitably constructed from plated metal rod and screen. FIGS. 14 and 15 illustrate an example embodiment of how food support 268 might hold typical contained food 270 during food preparation.

Figure 13:
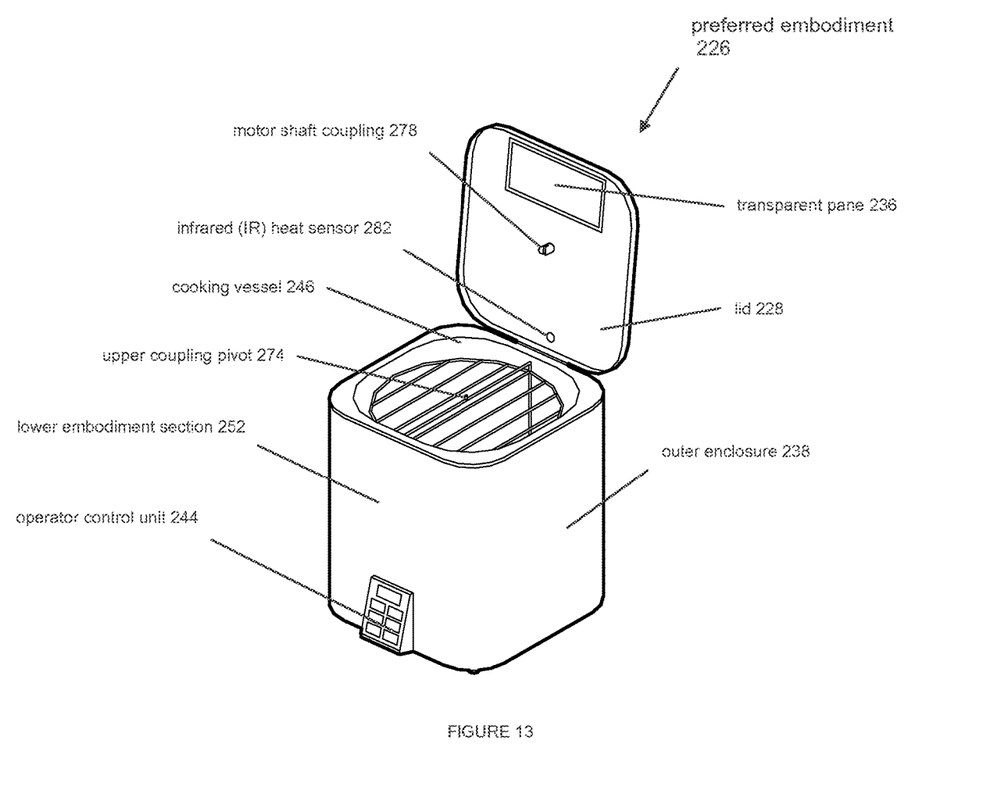
FIG. 13, is a perspective view of an example embodiment of a food cooker with an open lid.

Food support 268 includes lower pivot 272, and upper coupling pivot 274 (FIGS. 13 and 16 in particular).

In operation, cooking vessel 246 is placed into outer enclosure 238, which causes heat sensor 260 to be inserted up into heat sensor cover 256, and simultaneously causes disconnect able heat coil terminals 262 and 264 to couple with the terminal receptacles, including terminal receptacle 268.

Typical contained food 270 is then suitably mounted onto food support 268 (FIG. 15 as an example embodiment). An appropriate amount of cooking oil is suitably poured into cooking vessel 246, and heated, possibly under control from operator control unit 244.

Loaded food support 268 (as an example embodiment, FIG. 15) is suitably lowered into oil 276 contained within cooking vessel 246. This causes food support lower pivot 272 to rest into a conical, downward converging projection (not shown), which is disposed at or near the center of cooking vessel floor 258.

Lid 228 is then lowered (FIG. 12), which causes downward facing motor shaft coupling 278 to engage upper coupling pivot 274, located at or near the middle of the top of food support 268, resulting in rotational 267 linkage between drive motor 230 and food support 268 disposed around a vertical axis defined by lower pivot 272 with upper coupling pivot 274.

Operator control unit 244 is suitably then user directed for appropriate example embodiment 226 food preparation times and/or temperatures.

Drive motor 230 is suitably a gear reduced motor, such as a gear reduced: synchronous, or a twin poll induction, or a "C" frame induction motor, and advantageously rotates food support 268 at speeds between 2 RPM and 20 RPM, or at higher or lower speeds. Or drive motor 230 is suitably of other construction.

Rotation 267 of food support 268 helps circulate oil relative to food being prepared, thus potentially reducing food preparation times, and potentially enhancing even cooking heat distribution. This may occur during either low temperature or during high temperature food preparation, or at other times.

Alternatively, instead of full food support 268 rotation, food support 268 suitably oscillates between rotating food being prepared clockwise and then alternately rotating it counterclockwise.

Optionally, rotation, 267 is suitably turned off for certain embodiment operations.

Either fully rotational or oscillating rotational motion is suitably able to be viewed, such as through transparent pane 238. This suitably enhances perceived value for example embodiment 226, by potential buyers.

Such food support 268 and rotation 267 suitably also lowers cooking times by transporting heat more rapidly into typical contained foods 270 during food preparation. This increased thermal transfer efficiency is analogous to what happens in forced air convection ovens, where moving hot air against food facilitates significantly lower oven cooking times. However, because foods are wrapped in example embodiments, they may not dry out, unlike such convection ovens.

Such typical contained food 270 motion within low temperature, as well as high temperature cooking oil, as mentioned earlier, may, by creating turbulence, desirably also make cooking temperatures within cooking vessel 246 more even.

Metal screen 280 suitably helps prevent typical contained food 270 from coming too close to indented 254 heat coil 250, and thus may help prevent food exposure to potential bounded; anomalously excessive, cooking oil temperatures.

Infrared (IR) heat sensor 282 (FIGS. 13, 14 and 16) is similar to sensors used on inexpensive, widely sold, digital display, portable thermometers, and sensor 282 is suitably used as an alternative to, or to augment, heat sensor 260. From its position within enclosing drive motor cover 232 (FIG. 14), when lid 228 is lowered, sensor 282 is aimed downward, and detects the temperature of oil contained within cooking vessel 246. Heat sensor 282 is also suitably used for displaying cooking temperatures.

Infrared (IR) sensor 282 and heat sensor 260 are suitably used independently, or together. And either is suitably used to thermostatically control, or to thermally limit temperatures of the contents of cooking vessel 246, or for simple temperature detection/display, or for other purposes. Also, either one of them, or both of them, is suitably preset, or suitably allows user directed input.

Embodiments using present example embodiments during low or high temperature food preparation steps suitably terminate the preparation process, simply by turning off the heat source for the oil. Generally, there is no need to immediately remove the food from the oil directly after cooking has terminated.

This advantageously provides a major convenience. As an example embodiment, a switching timer, or programmed electronic circuit might be used to control, also as an example embodiment, heat coil 250. A user suitably sets this control so that cooking (i.e., electrically energizing, as an example, heat coil 250) takes place for an example cooking time of, say, five hours at, say, an example low temperature setting, after which it is then turned off. If the user does not return at that point, but rather returns minutes or even several hours later, this may facilitate very satisfactory cooking results, even when compared to removing the food from the oil directly after the five-hour example cooking time.

Foods generally do not have to be immediately removed from cooking oil directly after either high temperature, or low temperature food preparation.

Also, as an example embodiment, power consumption input into the cooking fluid (i.e. oil) contained within cooking vessel 246 for lower temperature cooking processes is suitably half or less of that used for higher temperature cooking processes.

As a specific non-limiting and non-exhaustive illustrative example of this, heat coil 250 suitably utilizes 1700 watts of energy for higher temperature cooking processes, and yet may use only 60 watts of energy, or less, for lower temperature cooking processes.

As disclosed earlier, this facilitates keeping cooking temperatures more even, particularly at low cooking temperatures, by cutting down on high temperature spikes from a too-powerful heat source.

Also as an example embodiments of alternative constructions, heat coils 178 and 250 might use other constructions, such as mat-type heaters (some of which use silicone rubber foundations), or plate-type heaters (some of which use glass as a foundation), or other constructions, either to replace or augment heat coils 178 and 250. Such heater constructions may facilitate more uniform heating by spreading heat introduction over a larger surface area.

The examples given herein have defined high temperature cooking processes as occurring above boiling. It has further been found advantageous, under certain circumstances, to use temperatures above 250° F.

The examples given herein have defined high temperature cooking processes as occurring above boiling, but with no upper limit. It has further been found advantageous, under certain circumstances, to use temperatures below 400° F. Such an upper limit is below the smoke point of many commonly used cooking oils. Also, this may fall below the upper temperature limits used in the standards followed by many US and foreign safety testing laboratories.

The examples given herein have defined low temperature cooking processes as occurring below boiling. It has further been found advantageous, under certain circumstances, to use temperatures below 190° F. Such a temperature limitation accommodates most sous vide cooking recipes.

Referring to FIG. 1, steps 1 through 5 (without re-immersing 124), is suitably performed independently to accomplish sous vide-like cooking results, but using present example embodiment cooking oil to replace sous vide cooking water.

Parenthetical figure references "(figure reference)" within this document are intended to help the reader locate specific figure locations where the referenced circumstances might be found. These parenthetical figure references do not necessarily represent an exhaustive list. Other locations, both within the figures, as well as possibly elsewhere, including, but not limited, to descriptions within this written specification, as well as references in the accompanying information disclosure statement might also be relevant.

With proper engineering of components, both example embodiment 170, as well as example embodiment 226 as described herein, with minor or no modification are suitably used for: deep frying, or boiling, or steaming, or traditional water bath sous vide food preparation. Therefore, embodiment 170, as well as embodiment 226 have the inherent potential of being multi-cookers (devices promoted as having multiple cooking functions), or the potential to be used independently for any of the above functions.

What have been shown herein are several example embodiments. Many variations of the teachings herein will be obvious to those knowledgeable in the art, and as such, should be considered as part of the teachings herein; the breath of protections afforded such teachings being defined only by the limits established for the claims awarded to this application.

What is claimed is:

1. A food preparation method, comprising the steps of:
   wrapping food within a pocket formed from a pliable, liquid tight, formable metallic sheet;
   at any time prior to cooking of the food, forming the pliable, liquid tight, formable sheet to conform to outer food surfaces;
   at any time after wrapping of the food, placing the conformed sheet and its contained food into cooking temperature oil, which is below an associated water boiling point, such that the contained food is disposed in the pocket and below a surface of the oil;
   placing the conformed sheet and contained food in the oil for a first cooking session which is long enough for an initial, souse vide style cooking of the food to occur;
   raising a temperature of the oil to above the water boiling point;
   placing the conformed sheet and its contained food, in the above water boiling point oil for a second cooking session, after the initial cooking, which is long enough for secondary cooking of the food to occur by contact with an inner surface of the conformed sheet such; and
   removing the food from the oil.

2. The food preparation method of claim 1, further comprising the steps of:
   after the first cooking session is complete, removing the food and the conformed sheet containing the food, from the oil; and
   during the second cooking session, positioning the food and the conformed sheet containing the food, in the oil.

3. The method of claim 1 further comprising wrapping the food within a pliable, liquid tight, formable sheet which includes a gas vent.

4. The method of claim 3 further comprising placing the conformed sheet and contained food in the oil such that the gas vent is positioned above a surface thereof.

5. The method of claim 3 further comprising wrapping within a pliable, liquid tight, formable sheet comprised of metallic foil.

6. A food preparation method, comprising the steps of:
   wrapping food within a vented pliable, liquid tight, formable sheet;
   at any time before cooking the food, forming the pliable, liquid tight, formable metallic sheet to conform to outer food surfaces;
   at any time after wrapping the food, placing the conformed sheet and its contained food into cooking temperature oil, which is below boiling, such that a vent of the conformed sheet remains above a surface of the oil;
   placing the conformed sheet and contained food in the cooking temperature oil long enough for a sous vide stile cooking of the food to occur by contact of the outer food surfaces with the conformed sheet;
   raising a temperature of the cooking oil above boiling temperature;
   retaining the conformed sheet in the cooking for a second cooking operation and
   removing the food from the oil.

7. The method of claim 6 further comprising placing the conformed sheet and contained food in the oil such that the vent is positioned above a surface thereof.

8. The method of claim 7 further comprising wrapping within a pliable, liquid tight, formable sheet comprised of metallic foil.

9. A food preparation method, comprising the steps of:
   wrapping food within a vented, pliable, liquid tight, metallic formable sheet;
   at any time before cooking the food, forming the pliable, liquid tight, formable sheet to conform to outer food surfaces;
   at any time after wrapping the food, placing the conformed sheet and its contained food into cooking temperature oil, which is below boiling for a first cooking duration;
   raising a temperature of the cooking oil above boiling, completing a second cooking duration;
   suspending, in both the first and second cooking durations, the conformed sheet and contained food in the cooking temperature oil long enough for cooking of the food to occur by contact of the outer food surfaces with the conformed sheet while a vent in the formable sheet remains above a surface of the oil; and
   removing the food from the oil.

10. The method of claim 9 further comprising placing the conformed sheet and contained food in the oil such that the gas vent is positioned above a surface thereof.

11. The method of claim 10 further comprising wrapping within a pliable, liquid tight, formable sheet comprised of metallic foil.

* * * * *